(12) United States Patent
McCauley et al.

(10) Patent No.: US 9,126,871 B2
(45) Date of Patent: Sep. 8, 2015

(54) CARBONATES AS RELIC PORE FORMERS IN ALUMINUM TITANATE

(75) Inventors: Daniel Edward McCauley, Watkins Glen, NY (US); Patrick David Tepesch, Corning, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 416 days.

(21) Appl. No.: 13/484,577

(22) Filed: May 31, 2012

(65) Prior Publication Data
US 2013/0323160 A1 Dec. 5, 2013

(51) Int. Cl.
*C04B 35/636* (2006.01)
*C04B 35/478* (2006.01)
*C04B 38/00* (2006.01)

(52) U.S. Cl.
CPC ........... *C04B 35/6365* (2013.01); *C04B 35/478* (2013.01); *C04B 35/636* (2013.01); *C04B 38/0006* (2013.01); *C04B 2235/3206* (2013.01); *C04B 2235/3208* (2013.01); *C04B 2235/3213* (2013.01); *C04B 2235/3217* (2013.01); *C04B 2235/3227* (2013.01); *C04B 2235/3232* (2013.01); *C04B 2235/3418* (2013.01); *C04B 2235/425* (2013.01); *C04B 2235/442* (2013.01); *C04B 2235/5436* (2013.01); *C04B 2235/5445* (2013.01); *C04B 2235/5463* (2013.01); *C04B 2235/5472* (2013.01); *C04B 2235/6021* (2013.01); *C04B 2235/96* (2013.01); *C04B 2235/9607* (2013.01)

(58) Field of Classification Search
USPC .................... 423/598, 430; 516/922
See application file for complete search history.

(56) References Cited

U.S. PATENT DOCUMENTS

| | | | | |
|---|---|---|---|---|
| 3,664,970 | A | * | 5/1972 | De Maio ...................... 502/243 |
| 4,135,018 | A | * | 1/1979 | Bonin et al. .................. 428/116 |
| 6,773,481 | B2 | | 8/2004 | Noguchi et al. ................ 55/523 |
| 7,250,384 | B2 | | 7/2007 | Morimoto et al. ............ 501/119 |
| 7,259,120 | B2 | | 8/2007 | Ellison et al. ................ 501/134 |
| 7,309,371 | B2 | | 12/2007 | Merkel et al. .................. 55/523 |
| 7,691,319 | B2 | * | 4/2010 | Inoue ............................ 264/630 |
| 7,744,670 | B2 | | 6/2010 | Miao et al. ..................... 55/523 |
| 2009/0220734 | A1 | | 9/2009 | Backhaus-Ricoult et al. ............................ 428/116 |
| 2010/0222200 | A1 | | 9/2010 | Tepesch et al. ................ 501/83 |
| 2010/0304965 | A1 | * | 12/2010 | Boek et al. .................... 502/344 |
| 2011/0124486 | A1 | | 5/2011 | Gallaher et al. ............... 501/80 |

* cited by examiner

Primary Examiner — Kaj K Olsen
Assistant Examiner — Pritesh Darji
(74) Attorney, Agent, or Firm — Charles A. Greene; Matthew J. Mason

(57) ABSTRACT

The disclosure relates to aluminum titanate-forming batch materials comprising inorganic batch components comprising at least one alkaline earth carbonate having a specified particle size distribution, methods of making ceramic bodies using the same, and ceramic bodies made in accordance with said methods.

17 Claims, 3 Drawing Sheets

CARBONATES AS RELIC PORE FORMERS IN ALUMINUM TITANATE

FIELD OF THE DISCLOSURE

Disclosed herein are aluminum titanate-body-forming batch materials comprising inorganic batch components and at least one alkaline earth carbonate having a specified particle size distribution.

BACKGROUND

Ceramic bodies comprising aluminum titanate may be used in a variety of applications. For example, such bodies are viable for use in the severe conditions of exhaust gas environments, including, for example as catalytic converters and as diesel particulate filters. Among the many pollutants in the exhaust gases filtered in these applications are, for example, hydrocarbons and oxygen-containing compounds, the latter including, for example, nitrogen oxides (NOx) and carbon monoxide (CO), and carbon based soot and particulate matter.

Physical and performance-related properties of ceramic bodies can be affected by the porosity characteristics of the bodies, which, in turn, can be affected type and amount of pore formers that are added to batch compositions used to make the bodies. For example, various types of fugitive pore formers (i.e., materials that evaporate or undergo vaporization by combustion during firing of a green body) have been used to impart various porosity characteristics to ceramic bodies. However, such pore formers are often expensive, can make extrusion and drying difficult, and often require complicated firing cycles to burn out without cracking the underlying parts.

The inventors have now discovered novel ceramic-body-forming batch materials, ceramic bodies, and methods of making the same that may allow for the ability to vary or tailor the properties of these ceramic bodies, for example their pore size, porosity, pore size distribution, and microstructure without solely relying on fugitive pore formers to impart desired porosity characteristics.

SUMMARY

In accordance with the detailed description and various exemplary embodiments described herein, the disclosure relates to an aluminum titanate-forming batch material. The aluminum-titanate forming batch material includes inorganic batch components that include at least one alkaline earth carbonate. At least 25% by weight of the at least one alkaline earth carbonate has a particle size of less than 2.5 microns and/or at least 25% by weight of the at least one alkaline earth carbonate has a particle size of greater than 10 microns. Less than 10% by weight of the at least one alkaline earth carbonate has a particle size of between 2.5 and 10 microns.

The disclosure further relates to a method of making an aluminum titanate body. The method includes preparing a batch material that includes inorganic batch components, wherein he inorganic batch components include at least one at least one alkaline earth carbonate. The method also includes forming a green body from the batch material and firing the green body to obtain a ceramic body. At least 25% by weight of the at least one alkaline earth carbonate has a particle size of less than 2.5 microns and/or at least 25% by weight of the at least one alkaline earth carbonate has a particle size of greater than 10 microns. Less than 10% by weight of the at least one alkaline earth carbonate has a particle size of between 2.5 and 10 microns.

The disclosure also relates to an aluminum titanate body made in accordance with a method that includes preparing a batch material that includes inorganic batch components, wherein the inorganic batch components include at least one at least one alkaline earth carbonate. The method also includes forming a green body from the batch material and firing the green body to obtain a ceramic body. At least 25% by weight of the at least one alkaline earth carbonate has a particle size of less than 2.5 microns and/or at least 25% by weight of the at least one alkaline earth carbonate has a particle size of greater than 10 microns. Less than 10% by weight of the at least one alkaline earth carbonate has a particle size of between 2.5 and 10 microns.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

The accompanying drawings are included to provide a further understanding of the invention as claimed and are incorporated in and constitute a part of this specification. The drawings are not intended to be restrictive, but rather illustrate exemplary embodiments and, together with the description, serve to explain the principles of the invention as claimed.

DETAILED DESCRIPTION

Figure 1:
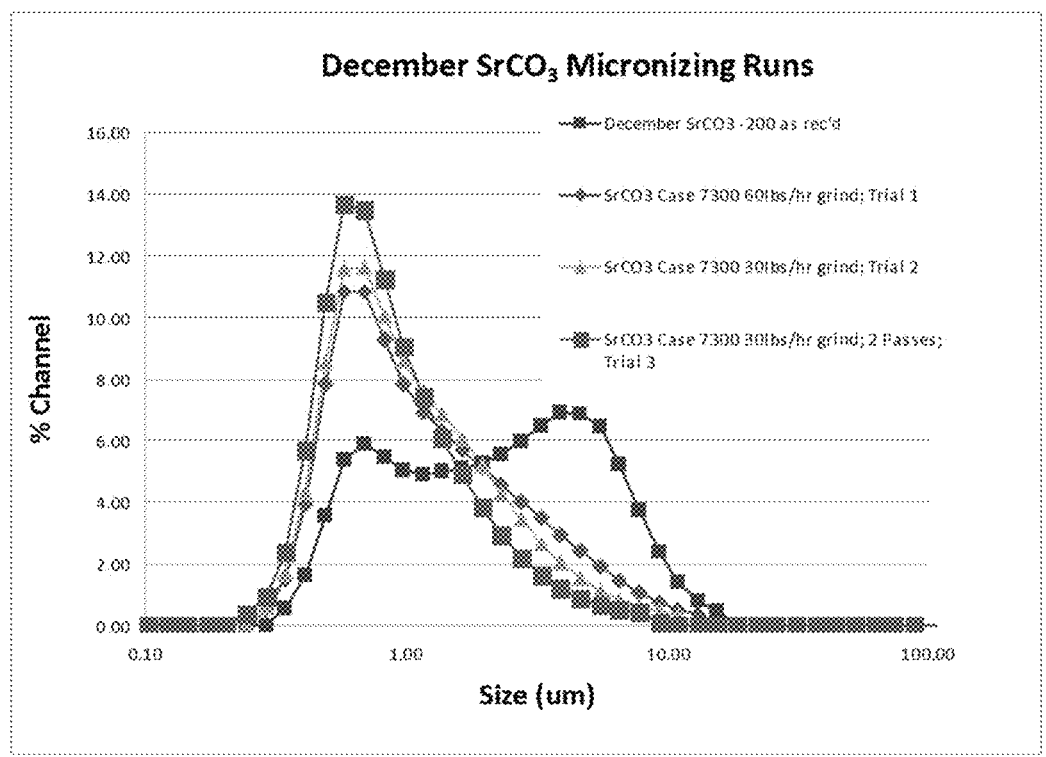
FIG. 1 plots particle size distributions of "as received" strontium carbonate (not subjected to a micoronization treatment) and strontium carbonate subjected to micronization treatments.
Figure 2:
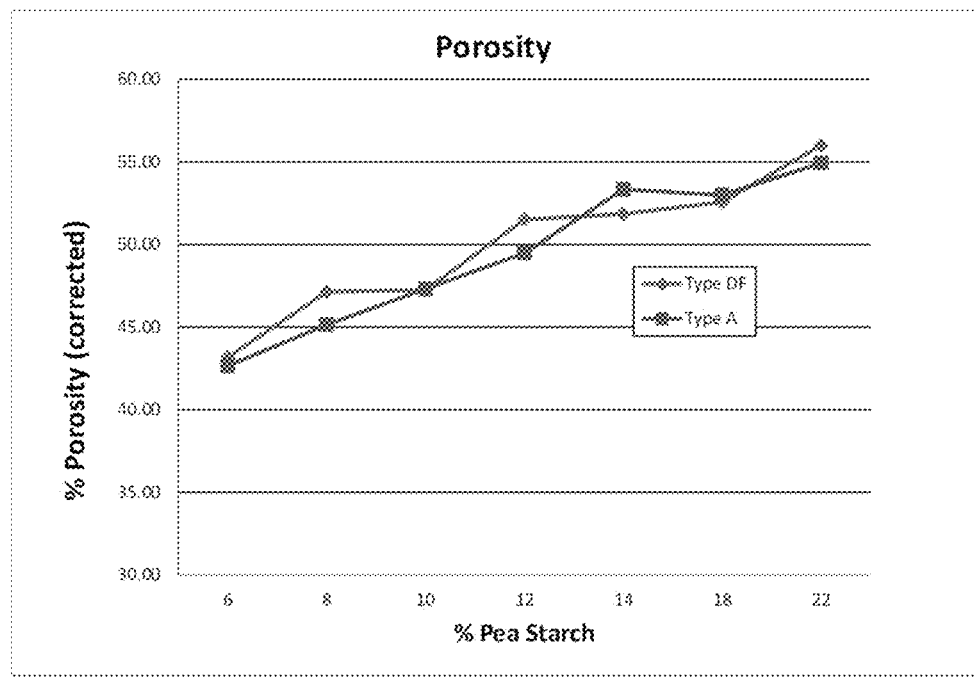
FIGS. 2-5 plot physical property data of fired aluminum titanate bodies, which include, as batch ingredients, strontium carbonate having differing particle size distributions as well as differing amounts of pore former.
Figure 3:
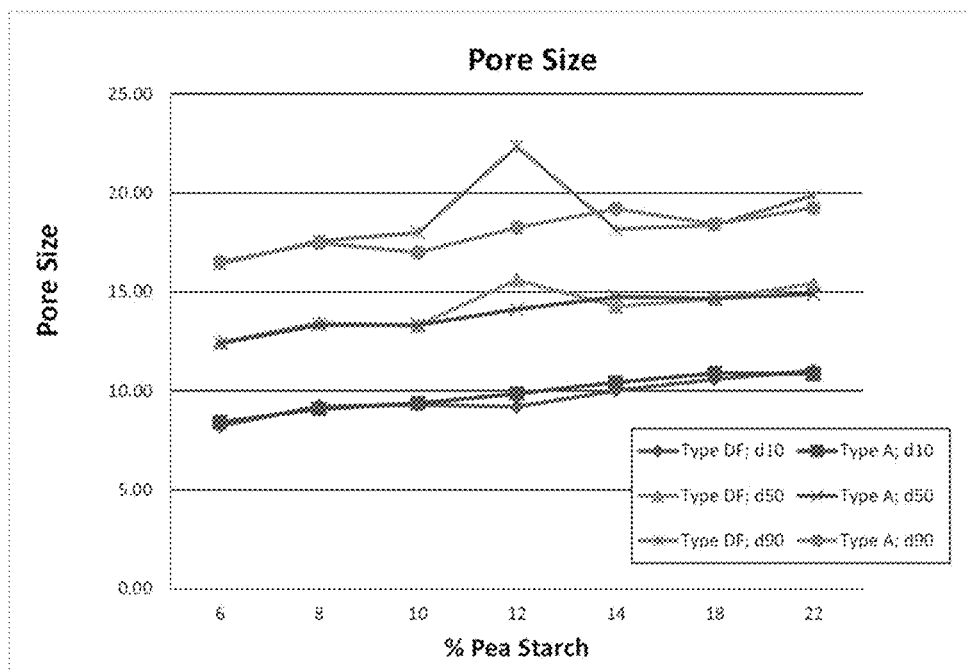
Figure 4:
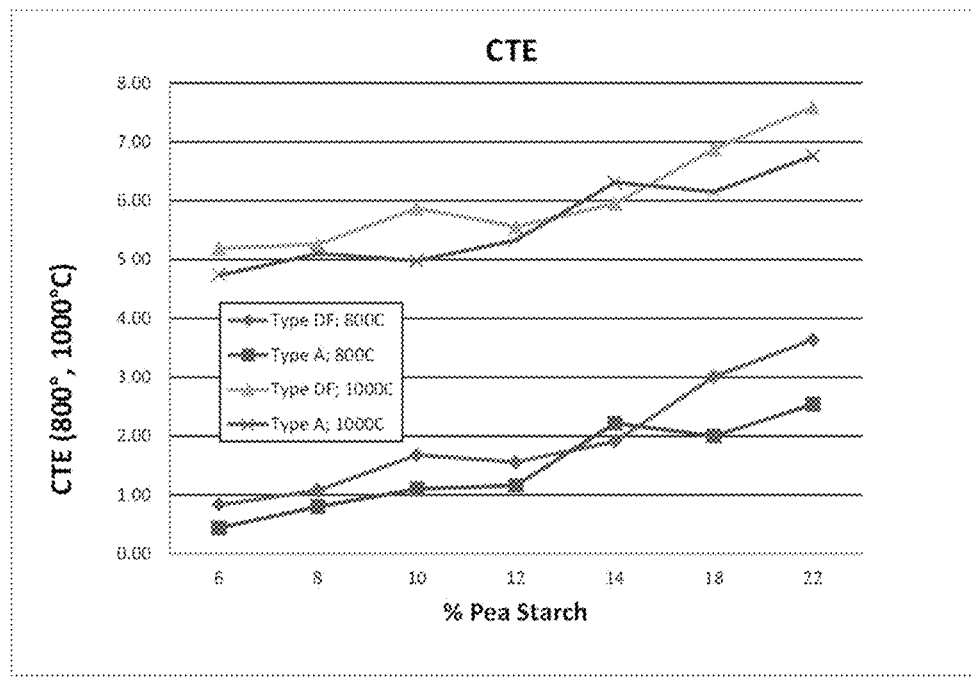
Figure 5:
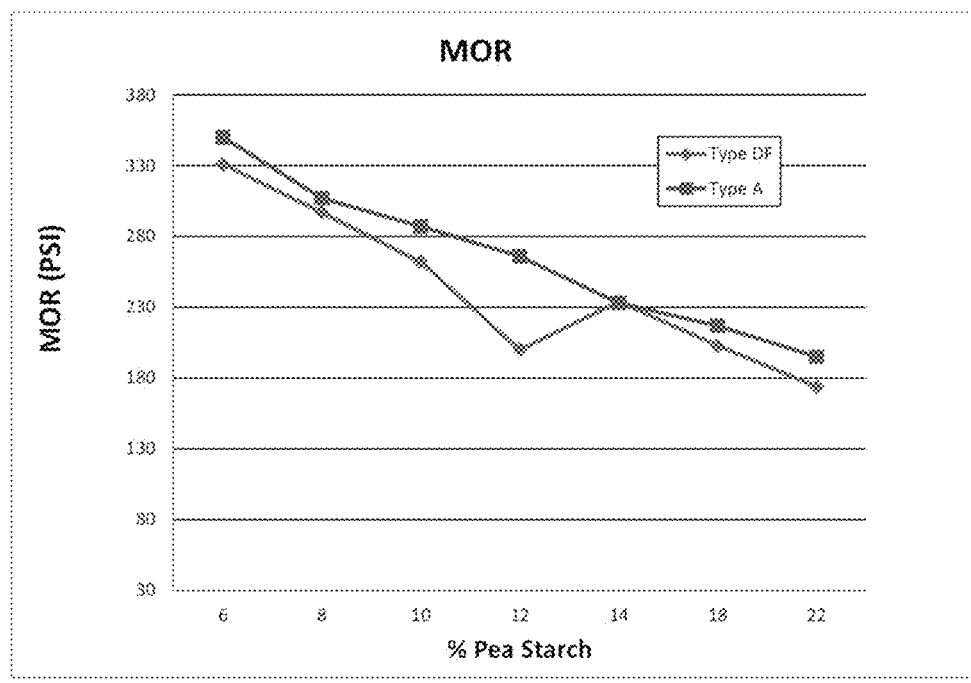

It is to be understood that both the foregoing general description and the following detailed description are exemplary and explanatory only, and are not restrictive of the claimed invention. Other embodiments will be apparent to those skilled in the art from consideration of the specification disclosed herein. It is intended that the specification and examples be considered as exemplary only.

As used herein, the use of "the," "a," or "an" means "at least one," and should not be limited to "only one" unless explicitly indicated to the contrary. Thus, for example, the use of "the alkaline earth carbonate" or "an alkaline earth" is intended to mean "at least one alkaline earth carbonate."

The disclosure relates to ceramic-body-forming batch materials comprising inorganic batch components comprising at least one alkaline earth carbonate.

As used herein, the terms "aluminum titanate-forming batch material," "batch material," and variations thereof, are intended to mean a substantially homogeneous mixture comprising inorganic batch components. The batch material of the present disclosure may be used to make ceramic bodies comprising aluminum titanate as a primary phase material, which may optionally include one or more secondary phase materials including, but not limited to, cordierite, mullite, alkali and alkaline-earth feldspar phases, and silicon carbide.

The inorganic batch components comprise at least one alkaline earth carbonate. Alkaline earth carbonates include those selected from the group consisting of beryllium carbonate, magnesium carbonate, calcium carbonate, strontium carbonate, and barium carbonate, such as the group consisting of magnesium carbonate, calcium carbonate and strontium carbonate and further such as the group consisting of magnesium carbonate and strontium carbonate and still further such as the group consisting of calcium carbonate and strontium carbonate. In certain exemplary embodiments, the alkaline earth carbonate comprises strontium carbonate. In certain exemplary embodiments, the alkaline earth carbonate comprises calcium carbonate. In certain exemplary embodiments, the alkaline earth carbonate comprises magnesium carbonate.

As used herein, the term "relic pore former" refers to a batch ingredient that is added with the intention of leaving a void having a size and shape approximately the same as the ingredient, wherein at least some of the ingredient becomes integrated into the final product composition. In embodiments disclosed herein, at least some of the alkaline earth carbonate acts as a relic pore former, wherein at least some of the alkaline earth metal ion of the alkaline earth carbonate reacts with at least one other batch ingredient during firing (instead of burning out) while at the same time, imparting porosity to the resulting fired ceramic article. This is in contrast to a fugitive pore former, wherein essentially all of the pore former material evaporates or undergoes vaporization by combustion during firing.

In certain exemplary embodiments disclosed herein, at least 25% by weight, such as at least 30% by weight, and further such as at least 35% by weight, and still further such as at least 40% by weight, and still yet further such as at least 45% by weight, and even still yet further such as at least 50% by weight of the at least one alkaline earth carbonate has a particle size of less than 2.5 microns and less than 10% by weight, such as less than 5% by weight, and further such as less than 2% by weight, and still further such as less than 1% by weight of the at least one alkaline earth carbonate has a particle size of between 2.5 and 10 microns.

In certain exemplary embodiments disclosed herein, at least 25% by weight, such as at least 30% by weight, and further such as at least 35% by weight, and still further such as at least 40% by weight, and still yet further such as at least 45% by weight, and even still yet further such as at least 50% by weight of the at least one alkaline earth carbonate has a particle size of greater than 10 microns and less than 10% by weight, such as less than 5% by weight, and further such as less than 2% by weight, and still further such as less than 1% by weight of the at least one alkaline earth carbonate has a particle size of between 2.5 and 10 microns.

In certain exemplary embodiments disclosed herein, at least 25% by weight, such as at least 30% by weight, and further such as at least 35% by weight, and still further such as at least 40% by weight, and still yet further such as at least 45% by weight, and even still yet further such as at least 50% by weight of the at least one alkaline earth carbonate has a particle size of less than 2.5 microns, at the same time, at least 25% by weight, such as at least 30% by weight, and further such as at least 35% by weight, and still further such as at least 40% by weight, and still yet further such as at least 45% by weight, and even still yet further such as at least 50% by weight of the at least one alkaline earth carbonate has a particle size of greater than 10 microns, and less than 10% by weight, such as less than 5% by weight, and further such as less than 2% by weight, and still further such as less than 1% by weight of the at least one alkaline earth carbonate has a particle size of between 2.5 and 10 microns.

For example, in certain exemplary embodiments, from 25% to 75% by weight, such as from 30% to 60% by weight of the at least one alkaline earth carbonate has a particle size of less than 2.5 microns and from 1% to 10% by weight such as from 2% to 8% by weight of the at least one alkaline earth carbonate has a particle size of between 2.5 and 10 microns.

In certain exemplary embodiments, from 25% to 75% by weight, such as from 30% to 60% by weight of the at least one alkaline earth carbonate has a particle size of greater than 10 microns and from 1% to 10% by weight such as from 2% to 8% by weight of the at least one alkaline earth carbonate has a particle size of between 2.5 and 10 microns.

In certain exemplary embodiments, from 25% to 75% by weight, such as from 30% to 60% by weight of the at least one alkaline earth carbonate has a particle size of less than 2.5 microns, while, at the same time, from 25% to 75% by weight, such as from 30% to 60% by weight of the at least one alkaline earth carbonate has a particle size of greater than 10 microns, and from 1% to 10% by weight such as from 2% to 8% by weight of the at least one alkaline earth carbonate has a particle size of between 2.5 and 10 microns.

In certain exemplary embodiments, at least one alkaline earth carbonate has a first particle size distribution with a median particle size ($pd_{50}$) in the range of 0.2 to 2 microns, such as a range of 0.5 to 1.5 microns, and at least one alkaline earth carbonate has a second particle size distribution with a median particle size ($pd_{50}$) in the range of 15 to 30 microns, such as a range of 20 microns to 25 microns.

As used herein, the term $pd_{10}$ refers to a particle size wherein 90% of the particles in a distribution have a larger particle size and 10% of the particles in a distribution have a smaller particle size.

As used herein, the term $pd_{90}$ refers to a particle size wherein 90% of the particles in a distribution have a smaller particle size and 10% of the particles in a distribution have a larger particle size.

As used herein, the term $pd_{50}$ refers to a particle size where 50% of the particles in a distribution have a smaller particle size and 50% of the particles in a distribution have a larger particle size.

As used herein, the term pd factor ($pd_f$)=($pd_{50}$−$pd_{10}$)/$pd_{50}$.

As used herein, the term pd breadth ($pd_{breadth}$)=($pd_{90}$−$pd_{10}$)/$pd_{50}$.

In various exemplary embodiments, at least one alkaline earth carbonate has a first particle size distribution with a $pd_{10}$ in the range of 0.1 to 1 microns, such as a range of 0.25 to 0.75 microns, and at least one alkaline earth carbonate has a second particle size distribution with a $pd_{10}$ in the range of 8 to 18 microns, such as a range of 10 to 15 microns.

In various exemplary embodiments, at least one alkaline earth carbonate has a first particle size distribution with a $pd_{90}$ in the range of 0.5 to 3 microns, such as a range of 1 to 2.5 microns, and at least one alkaline earth carbonate has a second particle size distribution with a $pd_{90}$ in the range of 25 to 75 microns, such as a range of 30 to 60 microns.

In various exemplary embodiments, the first particle size distribution has a pd factor ($pd_f$) of less than 0.4, such as a $pd_f$ of from 0.25 to 0.35 and the second particle size distribution has a pd factor ($pd_f$) of less than 0.5, such as a $pd_f$ of from 0.35 to 0.45.

In various exemplary embodiments, the first particle size distribution has a $pd_{breadth}$ of less than 2, such as a $pd_{breadth}$ of from 1.3 to 1.7 and the second particle size distribution has a $pd_{breadth}$ of less than 2, such as a $pd_{breadth}$ of from 1.3 to 1.7.

In various exemplary embodiments, at least 25% by weight, such as at least 35% by weight, and further such as at least 50% by weight of the at least one alkaline earth carbonate has the first particle size distribution and at least 25% by weight, such as at least 35% by weight, and further such as at least 50% by weight of the at least one alkaline earth carbonate has the second particle size distribution.

For example, in various exemplary embodiments, from 25% to 75% by weight of the at least one alkaline earth carbonate has the first particle size distribution and from 25% to 75% by weight of the at least one alkaline earth carbonate has the second particle size distribution.

In certain exemplary embodiments, the weight ratio of the at least one alkaline earth carbonate having the first particle size distribution to the at least one alkaline earth carbonate having the second particle size distribution can range from 0.25:1 to 4:1, such as 0.5:1 to 2:1, and further such as 0.8:1 to 1.2 to 1, including about 1:1.

In certain exemplary embodiments, the at least one alkaline earth carbonate having a first particle size distribution and a second particle size distribution is strontium carbonate.

In certain exemplary embodiments, the at least one alkaline earth carbonate having a first particle size distribution and a second particle size distribution is calcium carbonate.

In certain exemplary embodiments, the at least one alkaline earth carbonate having a first particle size distribution and a second particle size distribution is magnesium carbonate.

In certain exemplary embodiments, at least one alkaline earth carbonate having the first particle size distribution can comprise at least two alkaline earth carbonates. In certain exemplary embodiments, at least one alkaline earth carbonate having the second particle size distribution can comprise at least two alkaline earth carbonates.

For example, in certain exemplary embodiments the at least two alkaline earth carbonates having the first particle size distribution can be strontium carbonate and calcium carbonate and the at least two alkaline earth carbonates having the second particle size distribution can be strontium carbonate and calcium carbonate.

In certain exemplary embodiments, the at least two alkaline earth carbonates having the first particle size distribution can be strontium carbonate and magnesium carbonate and the at least two alkaline earth carbonates having the second particle size distribution can be strontium carbonate and magnesium carbonate.

In certain exemplary embodiments, at least one alkaline earth carbonate having the first particle size distribution can comprise at least three alkaline earth carbonates. In certain exemplary embodiments, at least one alkaline earth carbonate having the second particle size distribution can comprise at least three alkaline earth carbonates.

For example, in certain exemplary embodiments the at least three alkaline earth carbonates having the first particle size distribution can be strontium carbonate, magnesium carbonate and calcium carbonate and the at least three alkaline earth carbonates having the second particle size distribution can be strontium carbonate, magnesium carbonate and calcium carbonate.

In further embodiments, the inorganic components may further comprise components for forming various aluminum titanate bodies, including, but not limited to, at least one alumina source, at least one titania source, at least one silica source, and at least one rare earth metal oxide source.

Examples of batch materials for forming aluminum titanate honeycomb DPFs are disclosed in U.S. Pat. No. 7,259,120, the entire disclosure of which is incorporated herein by reference. For example, in certain embodiments, the inorganic batch can contain from 48 to 52 wt % alumina, from 28 to 32 wt % titania, from 8 to 12 wt % silica, from 7 to 10 wt % strontium carbonate, from 1 to 3 wt % calcium carbonate, and from 0 to 1 wt % lanthanum oxide, based on the total weight of the inorganic solid components in the batch.

The ceramic-forming-batch material may further comprise a fugitive pore former. Examples of fugitive pore formers include carbon (e.g., graphite (natural or synthetic), activated carbon, petroleum coke, and carbon black), starch (e.g., corn, barley, bean, potato, rice, tapioca, pea, sago palm, wheat, canna, and walnut shell flour), and polymers (e.g., polybutylene, polymethylpentene, polyethylene (preferably beads), polypropylene (preferably beads), polystyrene, polyamides (nylons), epoxies, ABS, Acrylics, and polyesters (PET)). In at least one embodiment, the pore former may be chosen from starches. By way of example only, the pore former may be a starch chosen from potato and pea starch.

Non-limiting examples of fugitive pore formers include Native Potato Starch marketed by Emsland Starke GmbH from Kyrita and Emlichheim, Germany facilities and Native Pea Starch marketed by Emsland Starke GmbH from the Emlichheim, Germany facility.

In various exemplary embodiments, the fugitive pore former may be chosen to be present in any amount to achieve a desired result. For example, the fugitive pore former may comprise at least 1 wt % of the batch material, added as a super-addition (i.e., the inorganic components comprise 100% of the batch material, such that the total batch material is 101%). For example, the fugitive pore former may comprise at least 5 wt %, at least 10 wt %, at least 15 wt %, at least 20 wt %, at least 30 wt %, at least 40 wt %, or at least 50 wt % of the batch material, added as a super-addition. In further embodiments, the fugitive pore former may comprise less than 25 wt % of the batch material, such as less than 20 wt %, and further such as less than 15 wt %, and still further such as less than 10 wt % as a super-addition. In certain embodiments, the fugitive pore former may comprise from 5% to 20% of the batch material, such as from 5% to 15% of the batch material as a super-addition.

In various embodiments of the disclosure, the batch material may be mixed with any other known component useful for making batch material. For example, the batch material may further comprise at least one organic binder. In such an embodiment, it is within the ability of one skilled in the art to select an appropriate binder. By way of example only, an organic binder may be chosen from cellulose-containing components, such as, for example, methylcellulose, methylcellulose derivatives, and combinations thereof.

It is also within the ability of one skilled in the art to select an appropriate solvent, if desired. In various exemplary embodiments, the solvent may be water, for example deionized water.

In additional exemplary embodiments, the batch material may be mixed with any other known component useful for making batch material, such as, for example, at least one lubricant.

The disclosure further relates to methods of making a ceramic body using batch materials of the disclosure, wherein said methods may comprise: preparing a batch material; forming a green body from said batch material; and firing the green body to obtain a ceramic body.

The ceramic-body-forming batch material may be prepared by any method known to those of skill in the art. By way of example, in at least one embodiment, the inorganic components may be combined as powdered materials and intimately mixed to form a substantially homogeneous mixture. The pore former may be added to form a batch mixture before or after the inorganic components are intimately mixed. In various embodiments, the pore former and inorganic components may then be intimately mixed to form a substantially homogeneous batch material. It is within the ability of one of skill in the art to determine the appropriate steps and conditions for combing the inorganic materials and pore former to achieve a substantially homogeneous batch material.

The additional components, such as lubricant, organic binder, and solvent, may be mixed with the batch material individually, in any order, or together to form a substantially homogeneous mixture. It is within the ability of one of skill in the art to determine the appropriate conditions for mixing the batch material with the additional components, such as organic binder and solvent, to achieve a substantially homogeneous material. For example, the components may be mixed by a kneading process to form a substantially homogeneous mixture.

The mixture may, in various embodiments, be formed into a ceramic body by any process known to those of skill in the art. By way of example, the mixture may be injection molded or extruded and optionally dried by conventional methods known to those of skill in the art to form a green body.

In various exemplary embodiments, the green body may then be fired to form a ceramic body. It is within the ability of one skilled in the art to determine the appropriate method and conditions for firing a ceramic body, such as, for example, firing conditions including equipment, temperature, and duration, to achieve a ceramic body, depending in part upon the size and composition of the green body.

The disclosure further relates to the ceramic bodies, and in particular ceramic bodies comprising aluminum titanate, made in accordance with the methods of the disclosure.

In at least one embodiment, the ceramic bodies may have a porosity in of at least 40%, such as at least 45%, and further such as at least 50%, and still yet further such as at least 55%, including in the range of from about 40% to about 70%, for example about 40% to 60%.

In certain embodiments, the ceramic bodies may have a median pore size ($D_{50}$) of from 12 to 16 microns, such as from 13 to 15 microns. The ceramic bodies may have a $D_{10}$ of from 8 to 12 microns, such as from 9 to 11 microns. The ceramic bodies may have a $D_{90}$ of from 16 to 20 microns, such as from 17 to 19 microns. The ceramic bodies may have a D factor ($D_f=(D_{50}-D_{10}/D_{50})$) of less than 0.30, such as less than 0.29, and further such as less than 0.28.

In further embodiments, the ceramic bodies may have a pore size distribution with a $D_{breadth}$ (i.e. $(D_{90}-D_{10})/D_{50}$) less than about 0.70 for example less than about 0.60, less than about 0.50, less than about 0.45, such as less than about 0.41

In certain embodiments, the ceramic bodies may have a modulus of rupture (MOR) of greater than 250 psi, such as greater than 275 psi, and further such as greater than 300 psi. Modulus of rupture was determined for parts having 300 cells per square inch and 10 mil thick walls using the four point flexure test.

In certain embodiments, the ceramic bodies may have a CTE (25-1000° C.) of less than $7 \times 10^{-7}$/° C., such as less than $6 \times 10^{-7}$/° C., and further such as less than $5 \times 10^{-7}$/° C. In certain embodiments, the ceramic bodies may have a CTE (25-800° C.) of less than $3 \times 10^{-7}$/° C., such as less than $2 \times 10^{-7}$/° C., and further such as less than $1 \times 10^{-7}$/° C.

In various embodiments, methods disclosed herein may further include reducing the variability in the particle size distribution of at least one alkaline earth carbonate comprising an inorganic batch component. As used herein, the term "reducing the variability in the particle size distribution" is intended to mean that various particle size parameters characterizing the material vary less from the standard or specifications for that material than is conventionally used. For example, in various embodiments of the disclosure, the median particle size ($pd_{50}$) of an alkaline earth carbonate particle size distribution may vary by about ±4 µm or less, such as about ±2 µm or less or about ±1 µm or less. In other embodiments, the $pd_{10}$ of an alkaline earth carbonate particle size distribution may vary by about ±0.5 µm or less, such as about ±0.25 µm or less or about ±0.125 µm or less. And, in other embodiments, the $pd_{90}$ of an alkaline earth carbonate particle size distribution may vary by about ±10 µm or less, such as about ±5 µm or less or about ±2.5 µm or less.

Reducing the variability in the particle size distribution of at least one alkaline earth carbonate can be accomplished by methods known to those of skill in the art and include, micronizing, milling, grinding, and/or classifying. For example, fine strontium carbonate (e.g., having a $pd_{50}$ of less than 5 microns) often contains agglomerates, which both raise the $pd_{50}$ as well as the distribution (e.g., $pd_f$ and $pd_{breadth}$). Breaking up these agglomerates by micronization or by other means acts to lower the $pd_{50}$ of the resulting distribution as well as reduce the variability of the distribution itself. FIG. 1 shows the result of micronizing fine strontium carbonate. As can be seen from FIG. 1, strontium carbonate that had been subjected to a micronization treatment (Runs 1-3) had a lower $pd_{50}$ as well as a narrower (smaller) pdf and $pd_{breadth}$ as compared to strontium carbonate that had not been subjected to a micronization treatment (as received).

When fired, the alkaline earth carbonate reacts into the matrix, leaving holes or pores in the ceramic body. The shape and size of these holes may be identical to the shape and size of the alkaline earth carbonate particles that created them.

By carefully selecting the particle size distribution of the alkaline earth carbonate, one may tailor the properties of the ceramic body, e.g., pore size distribution, and/or improve properties. In various embodiments, selecting an alkaline earth carbonate with a particle size distribution as disclosed herein may result in a ceramic body with increased strength, a reduced coefficient of thermal expansion, reduced shrinkage variability during firing, improved batch rheological properties (i.e., reduced wall drag and improved federate), improved microstructure (and reduced physical property variability), and improved porosity characteristics, such as narrower pore size distribution (increased filtration efficiency and lower pressure drop), more precise tuning of pore size distribution, and increased porosity while using less fugitive pore former (which can, in turn, enable faster and more efficient firing cycles).

EXAMPLES

Example 1

Four aluminum titanate batch compositions were prepared each comprising the same combination of raw inorganic ingredients, namely alumina, titania, silica, strontium carbonate, calcium carbonate, and lanthanum oxide, which were added within the ranges of weight percentages set forth above with reference to U.S. Pat. No. 7,259,120. Each of the raw inorganic ingredients were added in the same weight percentages in each of the four batches and each of the batches had the same binder (methylcellulose) added in the same weight percentage and the same water call. The only difference between the batches was the particle size distribution of the strontium carbonate, which was included at about 8 wt %, based on the total weight of the inorganic ingredients in the batch. Specifically, each batch had a strontium carbonate particle size distribution as plotted in one of the four distributions set forth in FIG. 1 (i.e., one batch with "as received" strontium carbonate and the other three batches with strontium carbonate that had been subjected to a micronization treatment prior to being added to the batch). The batches having the strontium carbonate subjected to the micronization treatment had superior rheological properties as compared to the batches having the "as received" strontium carbonate, as the batches subjected to the micronization treatment were softer and had less wall drag.

Following extrusion to a honeycomb-shaped body (e.g., 300 cells per square inch (cpsi)/10 mil web thickness), and drying, the green honeycomb-shaped bodies were fired using a standard aluminum titanate firing schedule as described in International Publication No. WO 2006/130759, which is incorporated herein by reference.

Physical properties of the resulting fired ware are set forth in Table 1.

TABLE 1

| Run | Porosity (%) | $D_{50}$ | $D_{10}$ | $D_{90}$ | $D_f$ | MOR (psi) | CTE (25-800° C. × $10^{-7}$/° C.) | CTE (25-1000° C. × $10^{-7}$/° C.) |
|---|---|---|---|---|---|---|---|---|
| As Received | 44.95 | 13.24 | 9.32 | 18.05 | 0.30 | 279 | 0.7 | 4.9 |
| Micronized Run 1 ($pd_{50}$ = 0.923 μm) | 44.99 | 13.17 | 9.53 | 17.47 | 0.28 | 271 | 1.4 | 5.7 |
| Micronized Run 1 ($pd_{50}$ = 0.894 μm) | 44.75 | 13.18 | 9.42 | 17.57 | 0.29 | 280 | 1.0 | 5.4 |
| Micronized Run 1 ($pd_{50}$ = 0.644 μm) | 44.80 | 13.07 | 9.39 | 17.21 | 0.28 | 282 | 0.8 | 4.9 |

As can be seen from Table 1, the micronized runs averaged a minor decrease in porosity and pore size, slightly better (lower) $D_f$, higher MOR, and lower CTE.

Example 2

In this example, batches and ceramic articles were made in the same manner as described in Example 1, except that the batches contained strontium carbonate having different particle size distributions as well as differing amounts of pea starch pore former as described in more detail below. Specifically, the batches contained either strontium carbonate with a relatively narrower particle size distribution and higher median particle size ("Type DF") or strontium carbonate with a relatively wider particle size distribution and lower median particle size ("Type A"). Specifically, the Type DF had a median particle size of about 6.5 microns and a $pd_{breadth}$ of about 1.2 and the Type A had a median particle size of about 2.2 microns and a $pd_{breadth}$ of about 2.7. The point of this study was to compare these ingredients over a porosity range that included low to high porosity versions of aluminum titanate. This was accomplished using a specified pore former control strategy, namely holding graphite constant (at 3.5wt %) while varying pea starch from 6 to 20wt %. Physical property results appear in FIGS. 2-5. Analysis of the average porosity and pore size data over this entire series indicates that a switch from Type DF to Type A resulted in an approximate 1% drop in porosity, about 1 um higher $D_{10}$, about 0.1 um lower $D_{50}$, and about 0.5 um lower $D_{90}$. In addition, CTE (25-1000° C.) was about 7% lower and MOR went up an average of about 10%.

Physical properties of the resulting fired ware are set forth in Table 2.

TABLE 2

| Run | Porosity (%) | $D_{50}$ | $D_{10}$ | $D_{90}$ | $D_f$ | MOR (psi) | CTE (25-800° C. × $10^{-7}$/° C.) | CTE (25-1000° C. × $10^{-7}$/° C.) |
|---|---|---|---|---|---|---|---|---|
| Standard commercially available AT | 49.17 | 14.67 | 8.41 | 20.96 | 0.43 | 259 | 1.42 | 5.78 |
| AT with Type DF $SrCO_3$ with 6% pea starch | 43.18 | 12.46 | 8.24 | 16.42 | 0.34 | 331 | 0.83 | 5.19 |
| AT with Type DF $SrCO_3$ with 8% pea starch | 47.14 | 13.44 | 9.22 | 17.57 | 0.31 | 297 | 1.08 | 5.26 |
| AT with Type DF $SrCO_3$ with 10% pea starch | 47.26 | 13.31 | 9.31 | 18.00 | 0.30 | 262 | 1.68 | 5.87 |
| AT with Type DF $SrCO_3$ with 12% pea starch | 51.52 | 15.61 | 9.21 | 22.35 | 0.41 | 200 | 1.56 | 5.56 |
| AT with Type DF $SrCO_3$ with 14% pea starch | 51.85 | 14.27 | 10.02 | 18.18 | 0.30 | 234 | 1.91 | 5.95 |
| AT with Type DF $SrCO_3$ with 18% pea starch | 52.57 | 14.66 | 10.60 | 18.38 | 0.28 | 203 | 3.01 | 6.88 |
| AT with Type DF $SrCO_3$ with 22% pea starch | 55.65 | 15.43 | 11.04 | 19.88 | 0.28 | 174 | 3.64 | 7.59 |
| AT with Type A $SrCO_3$ with 6% pea starch | 42.73 | 12.40 | 8.42 | 16.52 | 0.32 | 350 | 0.44 | 4.73 |
| AT with Type A $SrCO_3$ with 8% pea starch | 43.79 | 13.33 | 9.09 | 17.48 | 0.32 | 307 | 0.80 | 5.10 |
| AT with Type A $SrCO_3$ with 10% pea starch | 46.75 | 13.33 | 9.38 | 16.99 | 0.30 | 287 | 1.10 | 4.98 |
| AT with Type A $SrCO_3$ with 12% pea starch | 49.85 | 14.13 | 9.87 | 18.24 | 0.30 | 266 | 1.16 | 5.33 |

TABLE 2-continued

| Run | Porosity (%) | $D_{50}$ | $D_{10}$ | $D_{90}$ | $D_f$ | MOR (psi) | CTE (25-800° C. × $10-7/°$ C.) | CTE (25-1000° C. × $10-7/°$ C.) |
|---|---|---|---|---|---|---|---|---|
| AT with Type A $SrCO_3$ with 14% pea starch | 53.04 | 14.75 | 10.43 | 19.20 | 0.29 | 233 | 2.22 | 6.31 |
| AT with Type A $SrCO_3$ with 18% pea starch | 53.05 | 14.69 | 10.89 | 18.43 | 0.26 | 217 | 2.00 | 6.15 |
| AT with Type A $SrCO_3$ with 22% pea starch | 54.86 | 14.90 | 10.86 | 19.24 | 0.27 | 195 | 2.54 | 6.76 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. An aluminum titanate-forming batch material comprising:
   inorganic batch components comprising at least one alkaline earth carbonate;
   wherein at least 25% by weight of the at least one alkaline earth carbonate has a particle size of less than 2.5 microns and/or at least 25% by weight of the at least one alkaline earth carbonate has a particle size of greater than 10 microns;
   and less than 10% by weight of the at least one alkaline earth carbonate has a particle size of between 2.5 and 10 microns;
   wherein at least one alkaline earth carbonate has a first particle size distribution with a median particle size ($pd_{50}$) in the range of 0.2 to 2 microns and at least one alkaline earth carbonate has a second particle size distribution with a median particle size ($pd_{50}$) in the range of 15 to 30 microns.

2. The aluminum titanate-forming batch material of claim 1, wherein the at least one alkaline earth carbonate is selected from the group consisting of strontium carbonate, calcium carbonate, and magnesium carbonate.

3. The aluminum titanate-forming batch material of claim 1, wherein the at least one alkaline earth carbonate is strontium carbonate.

4. The aluminum titanate-forming batch material of claim 1, wherein at least 25% by weight of the at least one alkaline earth carbonate has the first particle size distribution and at least 25% by weight of the at least one alkaline earth carbonate has the second particle size distribution.

5. The aluminum titanate-forming batch material of claim 1, wherein the batch material comprises less than 25% by weight of fugitive pore formers as a super-addition.

6. The aluminum titanate-forming batch material of claim 1, wherein the batch material comprises from 5% to 20% by weight of fugitive pore formers as a super-addition.

7. A method of making an aluminum titanate body, said method comprising:
   preparing a batch material comprising inorganic batch components comprising at least one at least one alkaline earth carbonate;
   forming a green body from said batch material; and
   firing the green body to obtain a ceramic body;
   wherein at least 25% by weight of the at least one alkaline earth carbonate has a particle size of less than 2.5 microns and/or at least 25% by weight of the at least one alkaline earth carbonate has a particle size of greater than 10 microns;
   and less than 10% by weight of the at least one alkaline earth carbonate has a particle size of between 2.5 and 10 microns;
   wherein at least one alkaline earth carbonate has a first particle size distribution with a median particle size ($pd_{50}$) in the range of 0.2 to 2 microns and at least one alkaline earth carbonate has a second particle size distribution with a median particle size ($pd_{50}$) in the range of 15 to 30 microns.

8. The method of claim 7, wherein the at least one alkaline earth carbonate is selected from the group consisting of strontium carbonate, calcium carbonate, and magnesium carbonate.

9. The method of claim 7, wherein the at least one alkaline earth carbonate is strontium carbonate.

10. The method of claim 7, wherein at least 25% by weight of the at least one alkaline earth carbonate has the first particle size distribution and at least 25% by weight of the at least one alkaline earth carbonate has the second particle size distribution.

11. The method of claim 7, wherein the at least one alkaline earth carbonate having a first particle size distribution is micronized prior to being added to the batch material.

12. An aluminum titanate body made in accordance with a method comprising:
   preparing a batch material comprising inorganic batch components comprising at least one at least one alkaline earth carbonate;
   forming a green body from said batch material; and
   firing the green body to obtain a ceramic body;
   wherein at least 25% by weight of the at least one alkaline earth carbonate has a particle size of less than 2.5 microns and/or at least 25% by weight of the at least one alkaline earth carbonate has a particle size of greater than 10 microns;
   and less than 10% by weight of the at least one alkaline earth carbonate has a particle size of between 2.5 and 10 microns;
   wherein at least one alkaline earth carbonate has a first particle size distribution with a median particle size ($pd_{50}$) in the range of 0.2 to 2 microns and at least one alkaline earth carbonate has a second particle size distribution with a median particle size ($pd_{50}$) in the range of 15 to 30 microns.

13. The aluminum titanate body of claim 12, wherein the at least one alkaline earth carbonate is selected from the group consisting of strontium carbonate, calcium carbonate, and magnesium carbonate.

14. The aluminum titanate body of claim 12, wherein the at least one alkaline earth carbonate is strontium carbonate.

15. The aluminum titanate body of claim 12 wherein at least 25% by weight of the at least one alkaline earth carbonate has the first particle size distribution and at least 25% by weight of the at least one alkaline earth carbonate has the second particle size distribution.

16. The aluminum titante body of claim 12, wherein the aluminum body has a total porosity of at least 50%, a median pore size ($D_{50}$) of from 12 to 16 microns, a D factor ($D_f$) of less than 0.30, a modulus of rupture (MOR) of greater than 250 psi, and a CTE (25-1000° C.) of less than $7 \times 10^{-7}$° C.

17. The aluminum titanate body of claim 16, wherein the batch material comprises less than 25% by weight of fugitive pore formers as a super-addition.

* * * * *